USOO5551008A

United States Patent [19]
Saito

[11] Patent Number: 5,551,008
[45] Date of Patent: Aug. 27, 1996

[54] METHOD AND SYSTEM FOR RESUMING DATA PROCESSING IN COMPUTER

[75] Inventor: Toshimitsu Saito, Fuchu, Japan

[73] Assignee: Kabushiki Kaisha Toshiba, Kawasaki, Japan

[21] Appl. No.: 421,238

[22] Filed: Apr. 13, 1995

Related U.S. Application Data

[63] Continuation of Ser. No. 341,926, Nov. 16, 1994, Pat. No. 5,435,005, which is a continuation of Ser. No. 974,820, Nov. 16, 1992, abandoned, which is a continuation of Ser. No. 343,356, Apr. 26, 1989, abandoned.

[30] Foreign Application Priority Data

Apr. 30, 1988 [JP] Japan .................................. 63-108464

[51] Int. Cl.$^6$ ...................................................... G06F 1/24
[52] U.S. Cl. ................... 395/488; 364/285.1; 364/285.3; 364/259.3; 364/DIG. 1
[58] Field of Search ..................................... 395/800, 488, 395/489

[56] References Cited

U.S. PATENT DOCUMENTS 5,339,446  8/1994  Yamasaki ................................ 395/750

OTHER PUBLICATIONS

"RAM Stores µP data during ac failure" by Apte, P. R., Electronic Design, vol. 31, No. 13, 23 Jan. 1983, pp. 164–165.

Primary Examiner—Eric Coleman
Attorney, Agent, or Firm—Oblon, Spivak, McClelland, Maier & Neustadt, P.C.

[57] ABSTRACT

After a computer system is normally bootloaded, a resuming mode is set. When a power switch is off, a power source provides a power switch off signal. When the power switch off signal is detected and when the resuming mode flag is set, system data is stored in a file. When a predetermined time period elapses after the power switch is off or when a signal representing that the system data has been stored in the file is generated, the power source is turned off. When the power source is turned on, on the other hand, a memory is initialized. When the system data is stored in the file and when the resuming mode flag is set, the system data is read out from the file and restored in the memory. By such operations data processing can be resumed from the system state immediately prior to the turn-off of the power switch.

6 Claims, 7 Drawing Sheets

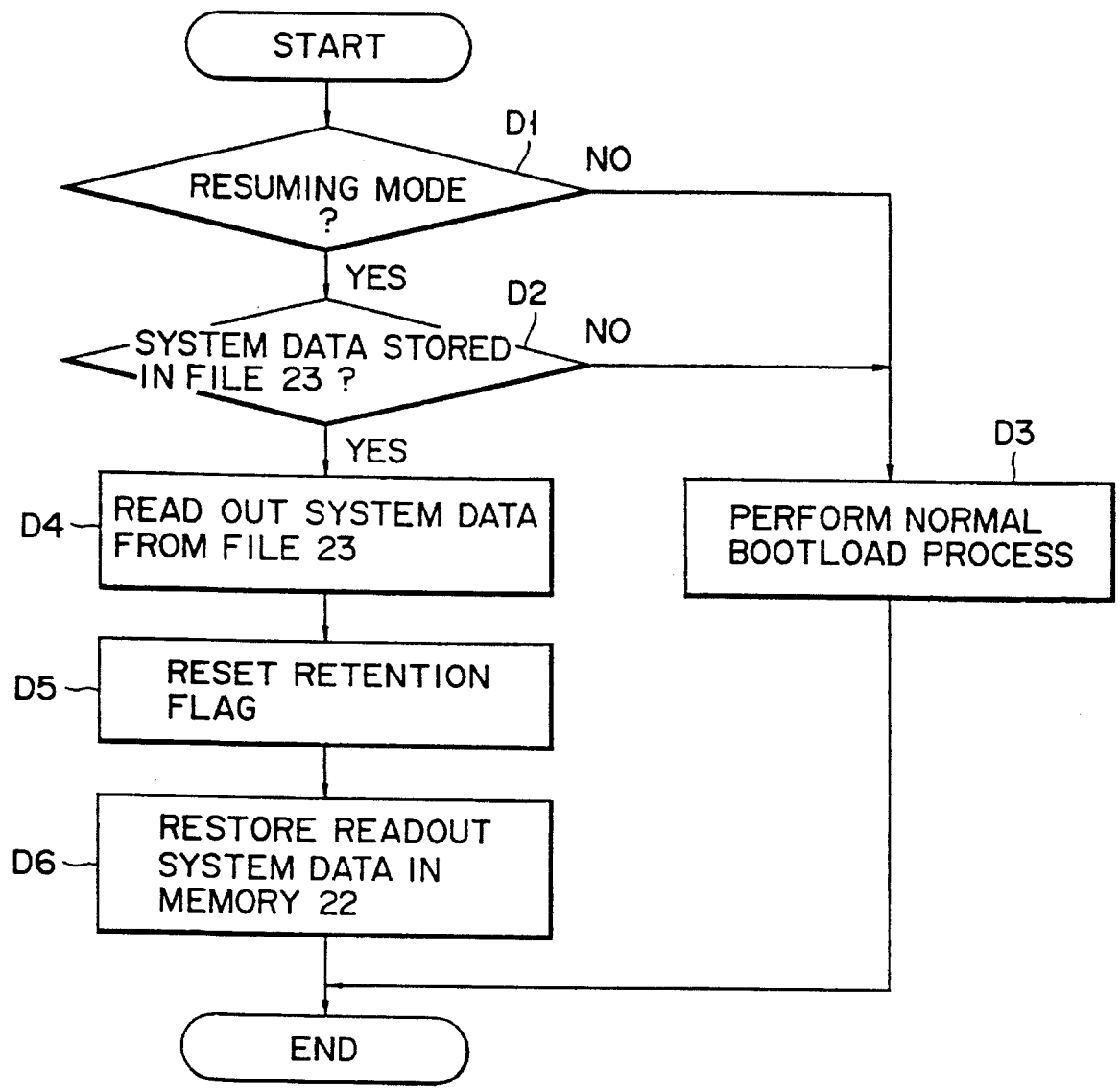
F I G. 5

METHOD AND SYSTEM FOR RESUMING DATA PROCESSING IN COMPUTER

This is a Continuation of application Ser. No. 08/341,926 filed on Nov. 16, 1994, now U.S. Pat. No. 5,435,005, which is a File Wrapper Continuation of Ser. No. 07/974,820, filed Nov. 16, 1992, now abandoned, which is a File Wrapper Continuation of Ser. No. 07/343,356 filed Apr. 26, 1989, now abandoned.

BACKGROUND OF THE INVENTION

1. Field of the Invention

The present invention relates to a method and system for resuming data processing in a computer.

2. Description of the Related Art

Owing to the advances of semiconductor technologies, microprocessors, peripheral-equipment controlling LSIs and memory LSIs have become available very inexpensively recently. High-performance computer systems can be constructed by a combination of those LSIs. With a personal computer, which is a typical example of the high-performance computer systems, when power is turned on, its component LSIs are initialized and a system boot program is read from a storage device, such as a floppy disk or a hard disk, into a memory so that messages are displayed on a display.

On the other hand, where an automatic execution file is stored, a program set in the file is started so that titles of programs are displayed. Power is turned off after predetermined processing is terminated by the execution of an application program.

When data processing is interrupted (power is turned off) and the data processing is resumed afterward (from the state immediately prior to the interruption), data readout and setting of the screen must be performed again.

A battery-driven personal computer has a function to instantly restore the state immediately prior to the turn-off of power by supplying electric power from a battery to a memory even after power is turned off. However, an AC-driven personal computer has no self-contained battery having enough capacity to always supply the power source to a memory and so on. But the AC-driven personal computer only includes a small capacity battery, which cannot be used to back up data or the state during a long time after the personal computer is turned off. In order to restore the state immediately before the turn-off of power, therefore, the above operations are required.

From the foregoing, AC-driven personal computers are required to have facilities for resuming data processing instantly without the need for a self-contained battery.

SUMMARY OF THE INVENTION

It is accordingly an object of the present invention to provide a method and system for resuming data processing for a computer.

According to one aspect of the present invention, there is provided a method for resuming a data process in a computer, the method comprising the steps of setting a resuming mode, storing mode flag data representing the resuming mode, system data used in the computer, retention flag data representing a retention of the system data in accordance with the set resuming mode when a power switch is off, stopping a supply of power to the computer, starting the supply of the power to the computer, reading out the stored system data in accordance with the mode flag data and the retention flag data when the power switch is on, thereby restoring the system data.

According to another aspect of the present invention, there is provided a system for resuming a data processing in a computer, the system comprising power source means for supplying power to the computer, and generating a power switch off signal when a power switch is off, mode setting means for setting a resuming mode, memory means for storing system data used in the computer, file means for storing mode flag data representing the resuming mode, the system data, and retention flag data representing a retention of the system data, control means for controlling a storage of the system data for file means in accordance with the mode flag data when the power switch off signal is generated in the power source means, and restoring means for reading out the system data from the file means in accordance with the retention flag data and restoring the read out system data into the memory means, when the power switch is on.

BRIEF DESCRIPTION OF THE DRAWINGS

FIG. 5 is a flowchart of the system data bootload section of FIG. 1;

DETAILED DESCRIPTION OF THE PREFERRED EMBODIMENTS

Figure 1:
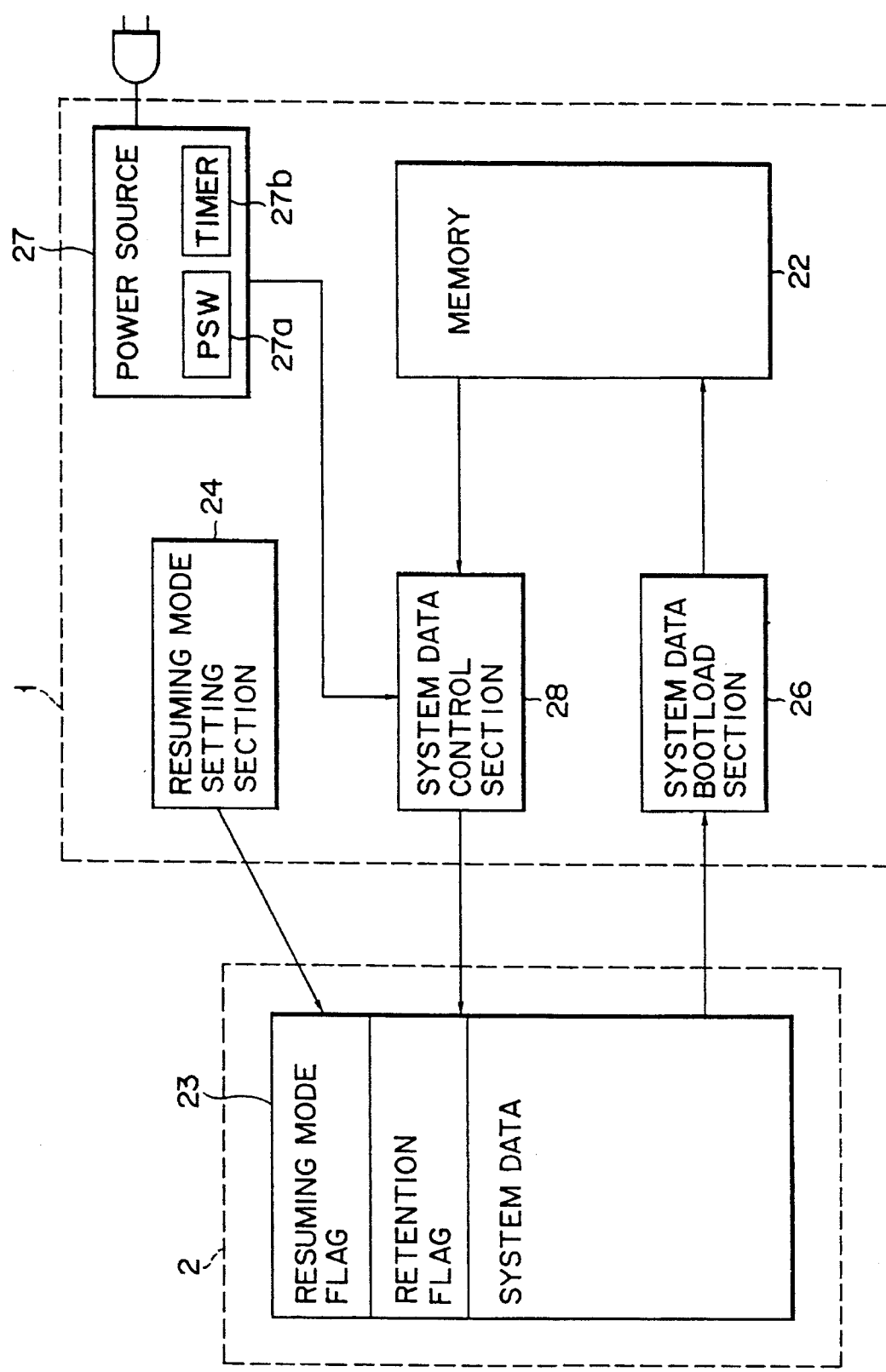
FIG. 1 is a block diagram of a computer system according to a first embodiment of the present invention.

Referring now to FIG. 1, a computer 1 comprises a power source 27, a memory 22, a resuming mode setting section 24, a system data control section 28 and a system data bootload section 26. External storage 2 has a file 23.

When a power switch (PSW) 27a is turned off by an operator, power source 27 provides a power switch off signal. Power source 27 is turned off by a timer 27b after a predetermined time period elapses.

Memory 22 stores application programs and processing data. Memory 22 corresponds to a CPU register, V-RAM and so on.

Resuming mode setting section 24 sets a resuming mode flag in file 23. The mode flag is set by the operator via a keyboard (not shown).

System data control section 28 detects the power switch off signal from power source 27 and stores the system data stored in memory 22 into file 23 according to the resuming mode flag. At this point a retention flag in file 23 is set.

System data bootload section 26 reads the system data from file 23 in accordance with the resuming mode flag and retention flag and restores the system data in memory 22.

Next, the operations of components of the system according to the first embodiment will be described with reference to FIGS. 2 to 5.

Figure 2:
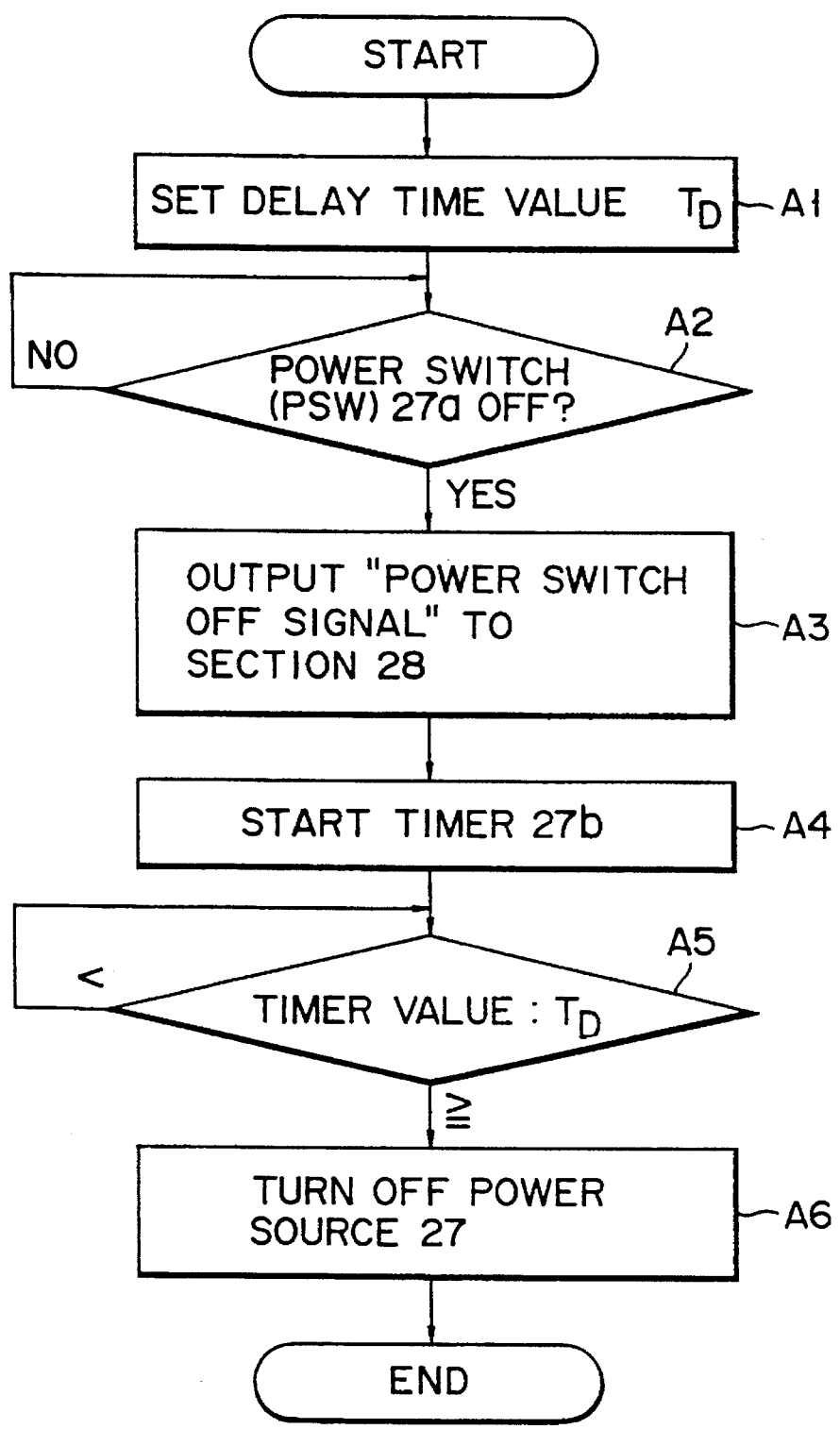
FIG. 2 is a flowchart representing the operation of the power source of FIG. 1.

FIG. 2 is a flowchart of the operation of power source 27 including a microprocessor not shown. A delay time value $T_D$ is set in power source 27 in step A1. A decision is made in step A2 as to whether power switch (PSW) 27a has been turned off or not. When power switch 27a is off, a power switch off signal is supplied to system data control section 28 in step A3. Timer 27b is started in step A4. In step A5, a comparison is made between a timer value of timer 27b and the delay time value $T_D$ set in step A1. When the timer value $\geq T_D$ in step A5, in other words, when a predetermined time period set by $T_D$ elapses, power source 27 is turned off.

Figure 3:
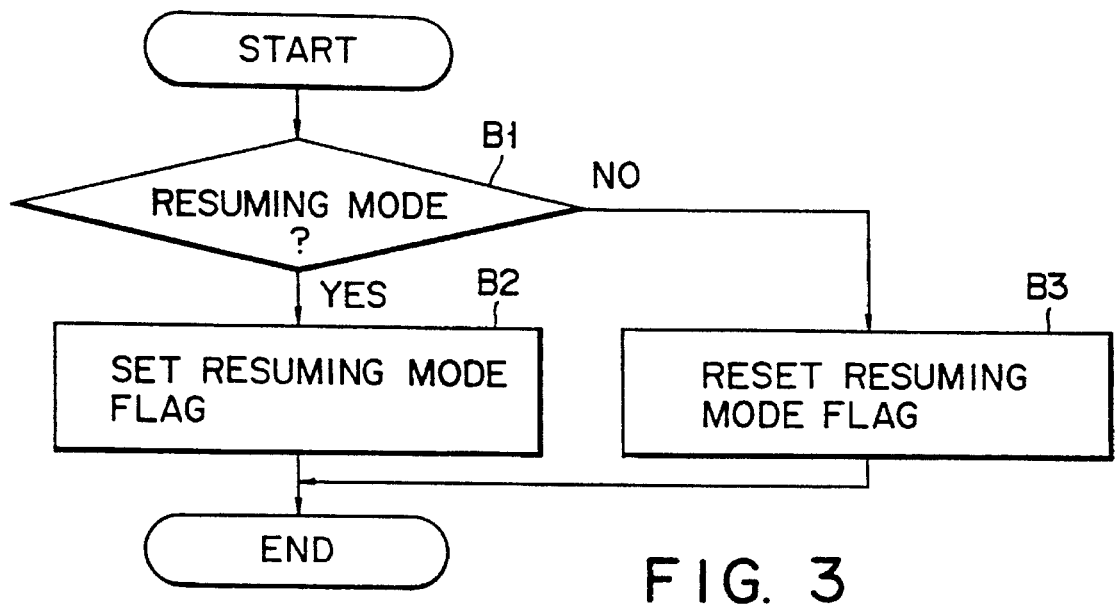
FIG. 3 is a flowchart of the operation of the resuming mode setting section of FIG. 1.

FIG. 3 is a flowchart of the operation of resuming mode setting section 24. In step B1 a decision is made as to whether or not a signal representing a resuming mode has been entered from the keyboard. If the signal has been entered, a resuming mode flag is set in file 23 in step B2. If the signal has not been entered, on the other hand, the resuming mode flag is reset in step B3.

Figure 4:
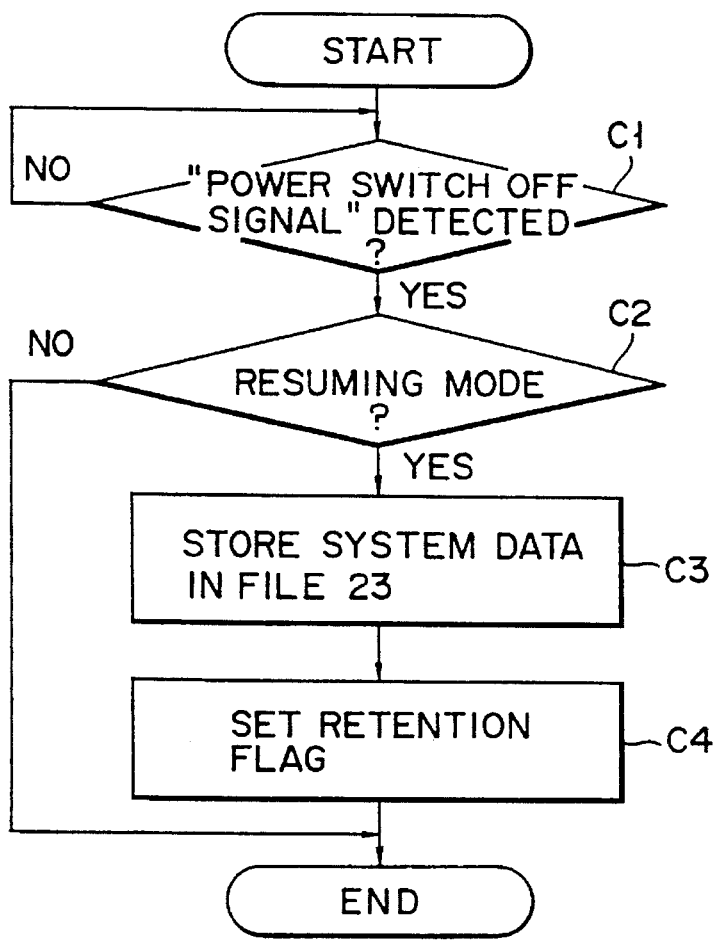
FIG. 4 is a flowchart of the operation of the system data control section of FIG. 1.

FIG. 4 is a flowchart representing the operation of system data control section 28. In step C1, a decision is made as to whether the power switch off signal from power source 27 has been detected or not. If the power switch off signal has been detected, a decision is made in step C2 as to whether the operation is in a resuming mode or not. In other words, a check is made as to whether the resuming mode flag is set or not in file 23. When the operation is in the resuming mode, the system data in memory 22 is stored in file 23 in step C3. The retention flag representing that the system data is stored in file 23 is set in step C4. When the operation is not in the resuming mode in step C2, steps C3 and C4 are not carried out.

FIG. 5 is a flowchart of the operation of the system data bootload section 26. In step D1, a decision is made as to whether the operation is in the resuming mode or not. When the operation is in the resuming mode in step D1, a decision is made in step D2 as to whether the system data is stored in file 23 or not (whether the retention flag is set or not). When decision is made in step D1 that the operation is not in the resuming mode, or when decision is made in step D2 that the system data is not stored in file 23, normal bootload process is performed in step D3.

When the system data is stored in file 23 in step D2, the system data is read out from file 23 in step D4. The retention flag is reset in step D5, the system data is restored in memory 23 in step D6.

By such processing as described above the system data is retained and restored.

Figure 6:
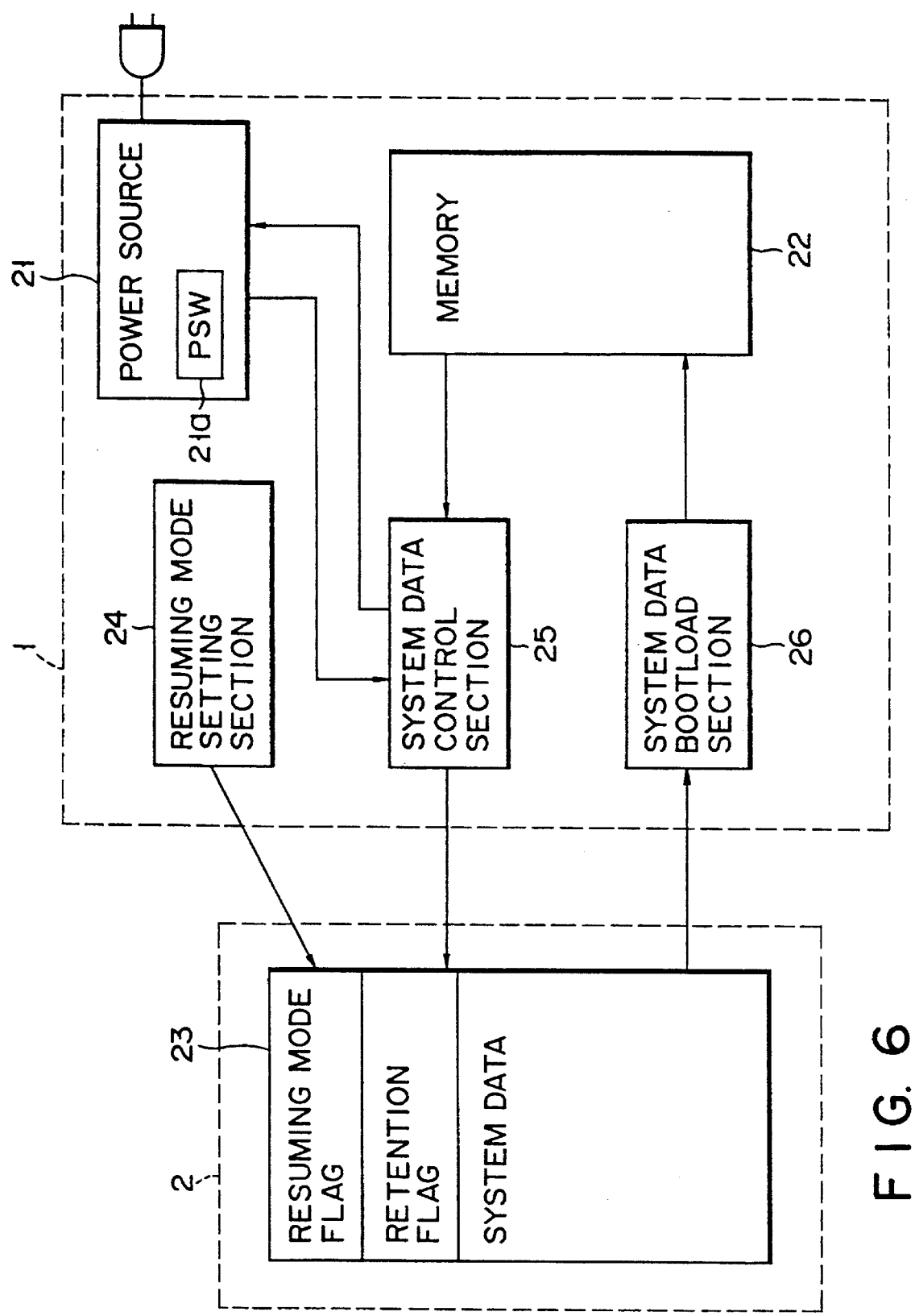
FIG. 6 is a block diagram of a computer system according to a second embodiment of the present invention.

FIG. 6 is a block diagram of a second embodiment system which is different from the first embodiment system in the operations of power source 21 and system data control section 25.

Figure 7:
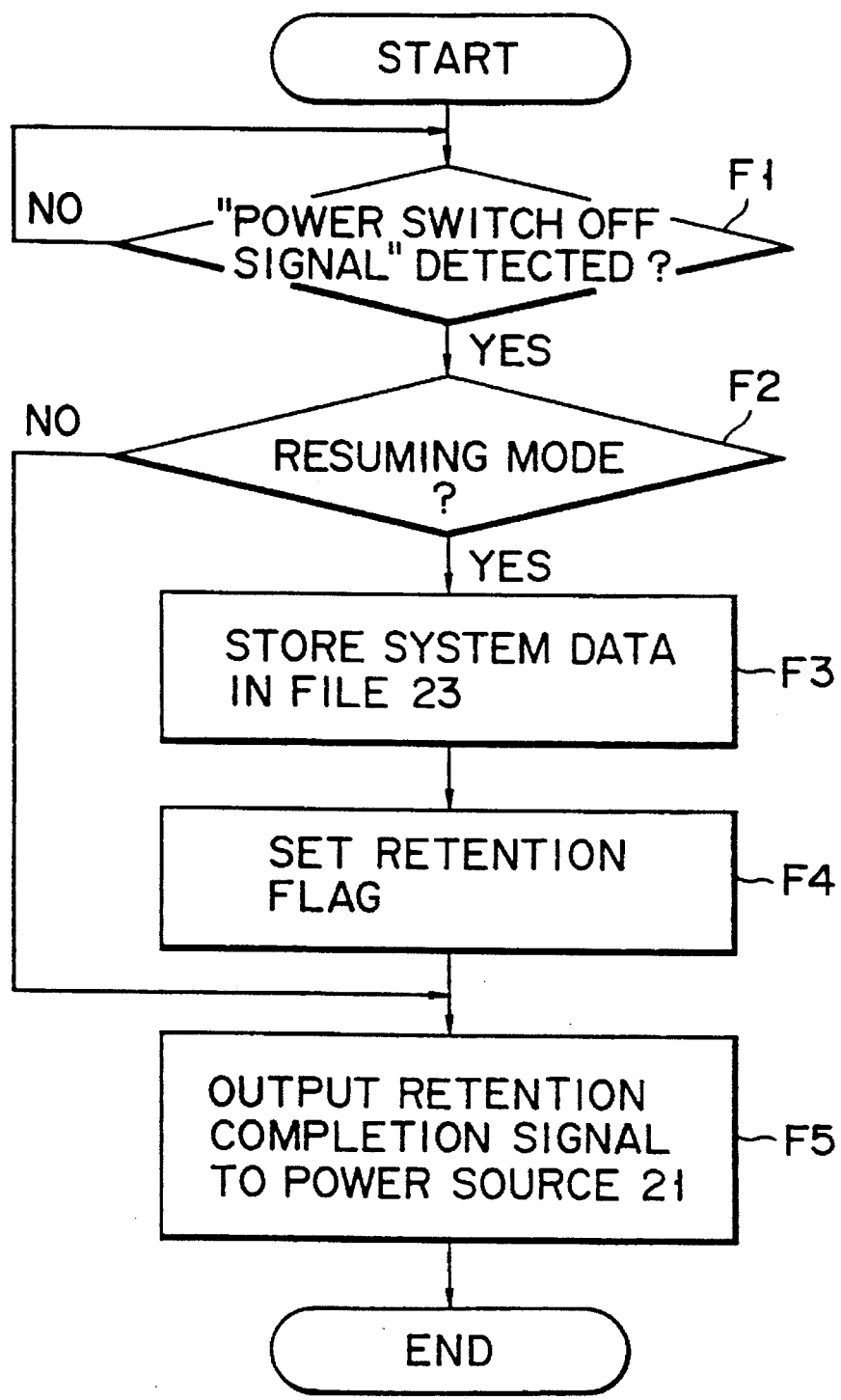
FIG. 7 is a flowchart of the operation of the system data control section of FIG. 6.

FIG. 7 is a flowchart of the operation of system data control section 25 shown in FIG. 6, the process of steps F1 to F4 are the same as those of steps C1 to C4 of FIG. 4. In step F5, a retention completion signal representing that the system data has been stored in file 23 is output to power source 21. Step F5 is also carried out when the operation is not in the resuming mode in step F2.

Figure 8:
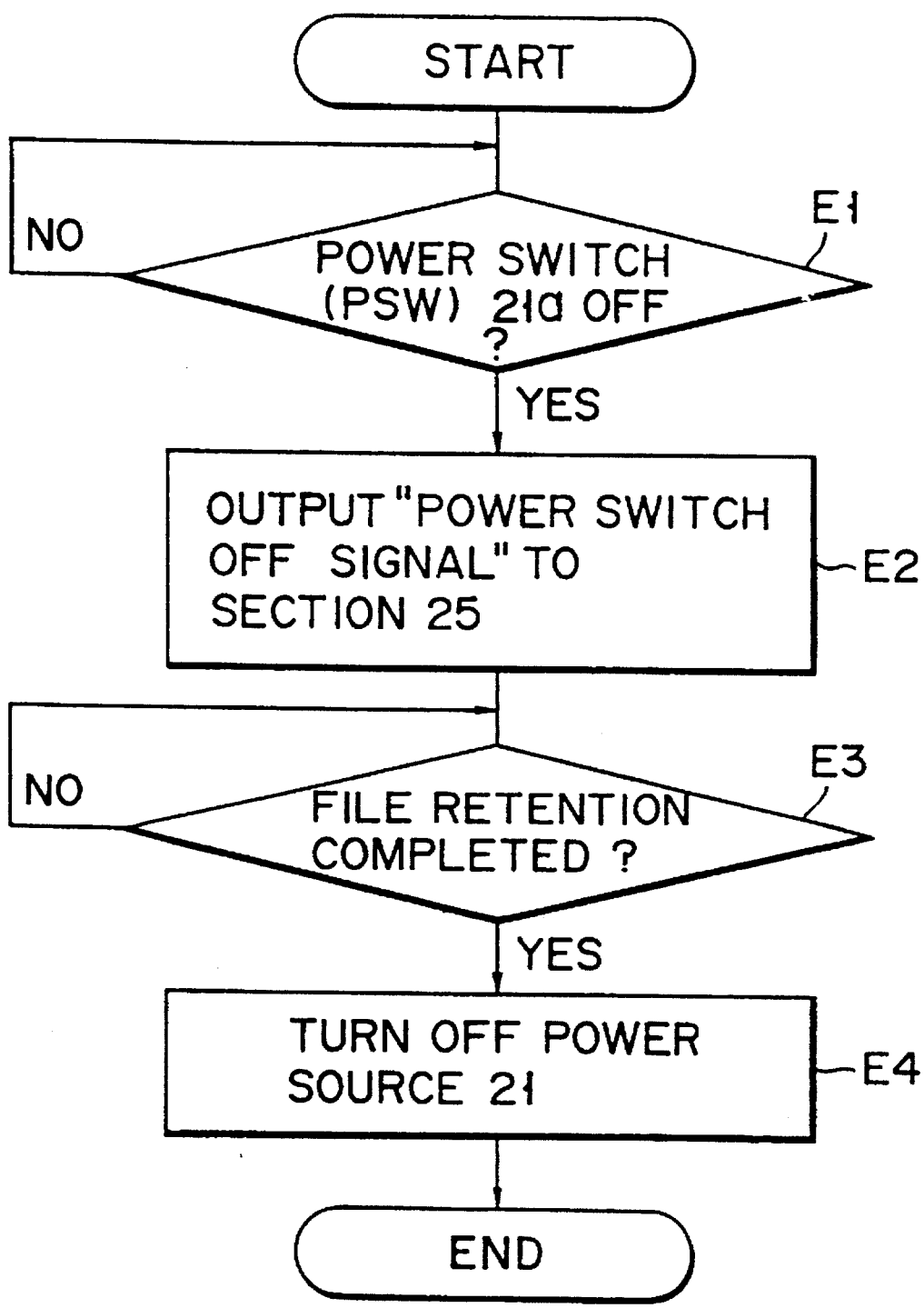
FIG. 8 is a flowchart of the operation of the power source of FIG. 6.

FIG. 8 is a flowchart of the operation of power source 21 shown in FIG. 6. In step E1, a decision is made as to whether power switch (PSW) 21a has been turned off or not. When PSW 21a is off in step E1, a power switch off signal is output to system data control section 25 in step E2. In step E3, a decision is made as to whether the system data has been stored in file 23 or not. The decision is made by whether or not the retention completion signal output in step F5 is detected in system data control section 25.

When the retention completion signal is detected, power source 21 is turned off in step E4.

Such processing as described above can also retain and restore the system data.

The operation of the embodiment system will be described briefly.

After the computer system is normally bootloaded, resuming mode setting section 24 sets or resets the resuming mode flag in file 23. When power switch 27a (21a) is off, power source 27 (21) outputs a power switch off signal to system data control section 28 (25). System data control section 28 (25) performs detection of the power switch off signal and check of the resuming mode. When the power switch off signal is detected and the resuming mode flag is set, the system data is stored in file 23. At this point the retention flag is set.

When a predetermined time period passes after power switch 27a (21a) is off or when the retention completion signal representing that the system data has been stored in file 23 is detected, power source 27 (21) is turned off.

When power source 27 (21) is turned on, on the other hand, memory 22 is initialized. When the resuming mode flag and the retention flag are set, the system data is read out from file 23 and restored in memory 22. At this point the retention flag is reset.

By such processing as described above, it becomes possible to resume data processing from a program counter address immediately prior to the turn off of the power switch in accordance with data restored in the CPU register.

Although the preferred embodiments of the present invention have been disclosed and described, it is apparent that other embodiments and modifications are possible.

What is claimed is:

1. A computer system to which an external storage device is connected, said computer system comprising:

a switch which instructs an ON/OFF condition of said computer system;

first holding means for holding resume flag data representing whether a resume mode is set;

storing means for storing system data of said computer system necessary for resuming data processing by said computer system into said external storage device when said switch instructs the OFF condition of said computer system and when the resume flag data represents that the resume mode is set;

second holding means for holding retention flag data representing that the system data has been stored in said external storage device;

outputting means for outputting a storage completion signal after the system data has been stored in said external storage device;

a power source supplying, in response to the instruction of the ON condition by said switch, power to said computer system in order to drive said computer system and stopping the power supply to said computer system in response to the store completion signal; and restoring means for restoring the system data stored in said external storage device into said computer system when said switch instructs the ON condition of said computer system, when the resume flag data represents that the resume mode is set and when said second holding means holds the retention flat data.

2. A computer system according to claim 1, wherein said restoring means resets the retention flag after the restoring means restores the system data.

3. A method of controlling operation of a computer system having an external storage device, a switch which instructs an ON/OFF condition of said computer system and a power source supplying, in response to the instruction of the ON condition by said switch, power to said computer system in order to drive said computer system and stopping the power supply to said computer system in response to a store completion signal, said method comprising the steps of:

holding resume flag data representing whether a resume mode is set;

storing system data of said computer system for resuming data processing by said computer system into said external storage device when said switch instructs the OFF condition of said computer system and when the resume flag data represents that the resume mode is set;

holding retention flag data representing that the system data has been stored in said external storage device;

outputting the store completion signal after the system data is stored in said external storage device; and restoring the system data stored in said external storage device into said computer system when said switch instructs the ON condition of said computer system, when the resume flag data represents that the resume mode is set and when the retention flat data is held.

4. A method according to claim 3, wherein said restoring step resets the retention flag data after the system data is restored.

5. A computer system, comprising:

an external storage device;

a switch which instructs an ON/OFF condition of said computer system;

first holding means for holding resume flat data representing whether a resume mode is set;

storing means for storing system data of said computer system necessary for resuming data processing by said computer system into said external storage device when said switch instructs the OFF condition of said computer system and when the resume flag data represents that the resume mode is set;

set means for setting retention flag data representing that the system data has been stored in said external storage device into said external storage device;

outputting means for outputting a storage completion signal after the system data is stored in said external storage device;

a power source supplying, in response to the instruction of the ON condition by said switch, power to said computer system in order to drive said computer system and stopping the power to said computer system in response to the store completion signal; and restoring means for restoring the system data stored in said external storage device into said computer system when said switch instructs the ON condition of said computer system, when the resume flag data representing that the resume mode is set and when the retention flag data is set in said external storage device.

6. A method of controlling operation of a computer system having an external storage device, a switch which instructs an ON/OFF condition of said computer system and a power source supplying, in response to the instruction of the ON condition by said switch, power to said computer system in order to drive said computer system and stopping the power supply to said computer system in response to a store completion signal, said method comprising the steps of:

holding resume flag data representing whether a resume mode is set;

storing system data of said computer system necessary for resuming data processing by said computer system into said external storage device when said switch instructs the OFF condition of said computer system and when the resume flag data represents that the resume mode is set;

setting retention flag data representing that the system data has been stored in said external storage device into said external storage device;

outputting the store completion signal after the system data is stored in said external storage device; and restoring the system data stored in said external storage device into said computer system when said switch instructs the ON condition of said computer system, when the resume flag data represents that the resume mode is set and when the retention flag data is set in said external storage device.

* * * * *